April 4, 1961
R. DAUB
2,978,284
PISTON HEAD STRUCTURE
Filed March 19, 1957
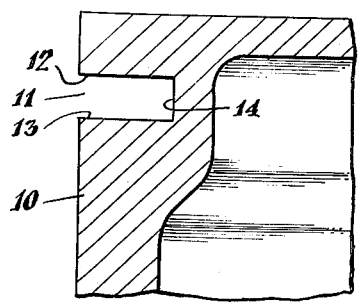
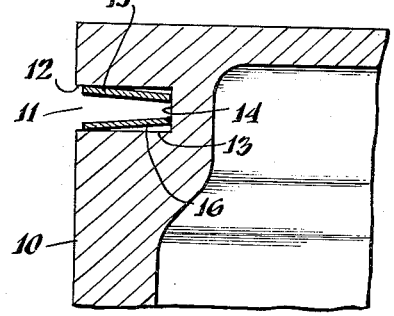
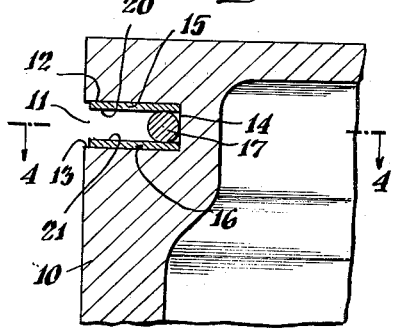
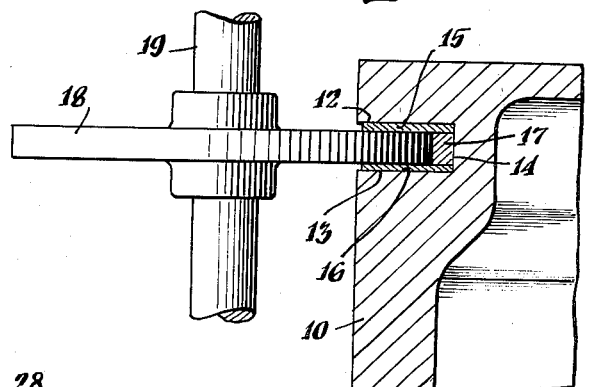
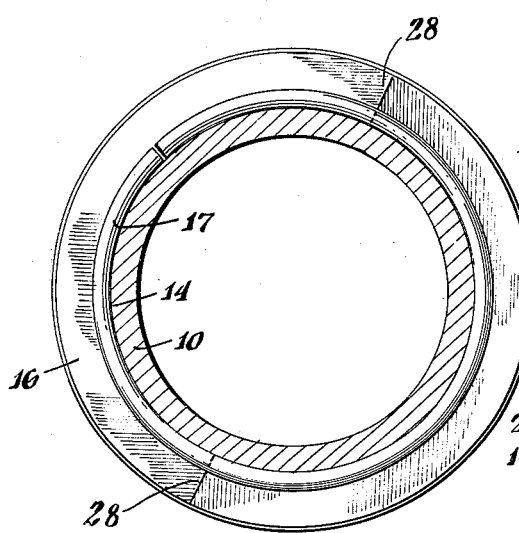
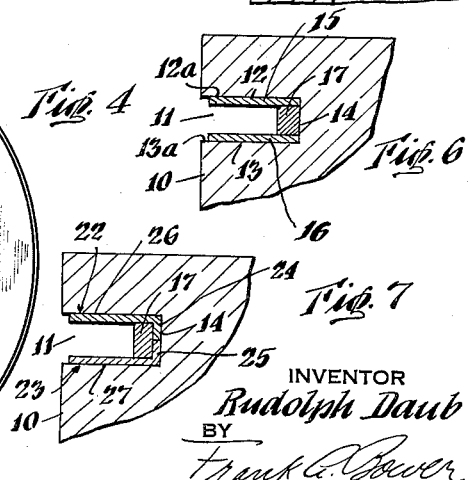
INVENTOR
Rudolph Daub
BY
ATTORNEY

United States Patent Office 2,978,284
Patented Apr. 4, 1961

2,978,284

PISTON HEAD STRUCTURE

Rudolph Daub, West Caldwell, N.J.
(9 Hickory Drive, North Caldwell, N.J.)

Filed Mar. 19, 1957, Ser. No. 647,150

3 Claims. (Cl. 309—14)

This invention relates to pistons for internal combustion engines and is particularly directed to the reinforcement of the piston ring grooves.

An object of this invention is to provide an internal combustion engine piston with piston ring grooves having reinforced surfaces for increasing the resistance to wear and deformation.

Another object of this invention is to provide a means for reforming and reinforcing a piston ring groove of a piston after the piston has been cast.

Other objects of this invention will become apparent from the specification taken in connection with the drawings in which Figs. 1–5 illustrate the steps of the reinforcement of a piston;

Fig. 6 illustrates the finished reinforced surfaces; and

Fig. 7 illustrates a sectional view of another embodiment of the reinforcement.

Referring to Figs. 1–5, a cast aluminum or aluminum alloy piston 10 has a groove 11 machined therein forming an upper surface 12, a lower surface 13, and an annular inner surface 14. The surfaces 12 and 13 preferably extend in radial planes and are preferably parallel. The disc-shaped rings 15 and 16 are placed in the groove 11. The rings 15 and 16 are similar and are made of a spring type steel. They are split in a generally radial direction to permit expansion, and snap around the piston in a manner similar to a piston ring. The rings are formed to assume an angle to the radial plane so that when placed in the groove 11, the rings 15 and 16 are at an angle to one another. The rings 15 and 16 are forced against the surfaces 12, 13, respectively, by inserting a split wire ring 17 in the groove. This wire ring is preferably made of aluminum and may be snapped around the piston in a manner similar to the insertion of a piston ring in a piston ring groove. The wire ring 17 is then deformed under the pressure of a wheel 18 mounted on a shaft 19. The pressure of the wheel forces the ring 17 against the annular wall 14 and spreads the ring 17 axially to force the radial rings 15 and 16 firmly against the upper and lower surfaces 12 and 13. The spring bias of the rings 15 and 16 holds the rings tightly against the surfaces 12 and 13 at the outer circumferential edge portions 12a and 13a so that a continuous tight seal is formed between the rings 15 and 16 and the surfaces 12 and 13 of the piston. The rings 15 and 16 thereby form continuous wear-resistant surfaces 20 and 21. The wear-resistant surfaces 20 and 21 extend continuously circumferentially around the upper and lower surfaces of the piston ring groove and form a smooth continuous surface against which the piston ring seals during operation of the piston is an internal combustion engine.

The rings 15 and 16 form a wide surface to distribute the pressure of the piston ring over the surfaces 12 and 13 of the piston. Thus, the piston ring groove maintains its shape over a long period of operation of the piston, thereby greatly extending the life of the piston in an internal combustion engine. The above invention also has the advantage of permitting the reconditioning of pistons having deformed or worn piston ring grooves. The groove 11 is formed in the worn piston, removing the worn piston ring groove surfaces and forming the new smooth surfaces 12 and 13. The hard steel rings 15 and 16 form new hard wear-resistant piston ring groove surfaces which are more resistant to wear than the piston ring groove surfaces of the original piston. Thus, the reconditioned piston has a longer life than the original piston.

In Fig. 7 another embodiment of the invention is shown in which split rings 22 and 23 are fitted in the groove 11. The rings have annular portions 24 and 25. The aluminum wire 17 is fitted therein and deformed in a manner similar to that illustrated in Fig. 5 to press the upper and lower radial portions 26 and 27 against the surfaces 12 and 13, respectively. The deformed wire presses against the annular portions 24 and 25 to further radially lock the rings in place. In both the embodiments in Figs. 6 and 7 the rings 15 and 16 and the portions 26 and 27 may be machined to form the smooth wear-resistant surfaces against which the piston ring seals.

The rings 15 and 16 may each have a single slit for fitting around the piston or each may be formed in two separate pieces, as illustrated in Fig. 4, ring 16 is fitted around the piston to abut at 28. Similarly, the rings 22 and 23 may either have a slit or be formed in two pieces. In another modification the annular portions may be jointed to connect the upper and lower rings. The ring may be formed in two parts, similar to the embodiment shown in Fig. 4, to fit the ring around the piston. The aluminum wire is then pressed to securely hold the pieces in place.

Further modifications may be made in this invention without departing from the scope of the invention.

I claim:

1. A piston structure comprising a cylindrical piston head, a piston ring groove formed radially in said piston head with upper and lower radially extending surfaces, circumferentially extending hard wear-resistant radial metal rings bearing against said upper and lower surfaces and having outer circumferential edge portions, and a separate inner annular ring of malleable pressure deformable metal applying a force against the inner ends of said radial rings to securely hold said radial rings against said upper and lower surfaces and forming an annular piston ring chamber, said radial rings having an internal biasing stress pressing said edge portions against said radially extending surfaces to seal the rings and radial surfaces and having circumferentially extending radial wear-resistant surfaces on opposite sides of said chamber to receive the pressure of a piston ring.

2. A piston structure comprising a cylindrical piston head, a piston ring groove formed radially in said piston head with upper and lower radially extending surfaces, a circumferentially extending hard wear-resistant radial metal ring bearing against one of said surfaces and having an outer circumferential edge portion, and a separate inner annular ring of malleable pressure deformable metal applying a force against the inner end of said radial ring to securely hold said radial ring against said surface and form an annular piston ring chamber with said ring and said surface, said radial ring having an internal biasing stress pressing said edge portion against a respective radially extending surface to seal the ring and said radial surface and having a circumferentially extending radial wear-resistant surface on one side of said chamber to receive the pressure of a piston ring.

3. A piston structure as set forth in claim 1 wherein said radial rings each have inner annular portions forming an inner annular wall and said annular ring presses against said annular portions to radially lock said rings in said groove.

References Cited in the file of this patent

UNITED STATES PATENTS

| | | |
|---|---|---|
| 1,781,207 | Wysong | Nov. 11, 1930 |
| 2,124,360 | Welty | July 19, 1938 |
| 2,229,578 | Malpas | Jan. 21, 1941 |
| 2,563,853 | Marien | Aug. 14, 1951 |
| 2,620,530 | | |
| 2,685,729 | | |
| 2,716,581 | | |
| 2,815,255 | | |
| 2,851,317 | | |
| | Sulprizio | Dec. 9, 1952 |
| | Daub | Aug. 10, 1954 |
| | Townhill | Aug. 30, 1955 |
| | Phillips | Dec. 3, 1957 |
| | Greifenstein | Sept. 9, 1958 |

FOREIGN PATENTS

| 460,420 | Great Britain | Jan. 21, 1937 |
|---|---|---|
| 1,066,931 | France | Jan. 27, 1954 |